March 1, 1960  D. MOON  2,926,508
DEVICE FOR SERVING COOL DRINKS
Filed Dec. 20, 1954
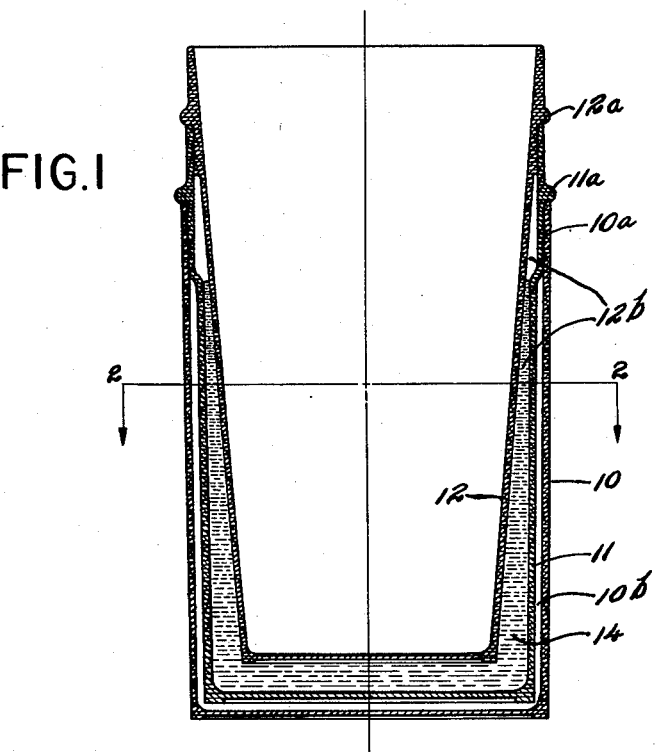
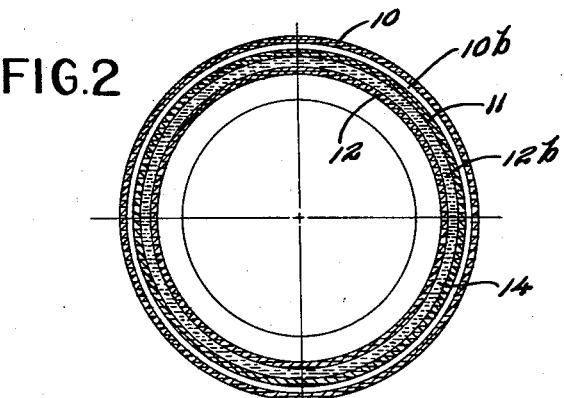
MRS DAISY MOON  INVENTOR.
BY *Chas. C. Reif.*
ATTORNEY

2,926,508
DEVICE FOR SERVING COOL DRINKS

Daisy Moon, Washington, D.C.

Application December 20, 1954, Serial No. 476,439

1 Claim. (Cl. 62—457)

This invention relates to a device for serving cool drinks, such as cocktails, wine, soft drinks, etc.

It is a common practice to serve many drinks, including cocktails, in a drinking glass, and to place ice in the drink for cooling the drink. This practice has several objections. In the first place, the ice melts in the drink and so dilutes the drink that the taste and flavor are often so changed as to be objectionable. The glass in which the drink is served is held in the hand of the drinker and the heat of the hand warms the glass and the drink to such an extent that the ice in the drink is often entirely melted and the drink becomes objectionably warm before it is all consumed.

It is an object of this invention to produce a device in which the drink can be kept desirably cool and in which the drink will not be objectionably warmed by the heat of the hand holding the glass.

It is a further object of the invention to provide a device for serving cool drinks in which ice may or may not be placed in the drink.

It is also an object of the invention to provide a device for serving cool drinks which comprises three nested containers, the inner one of which is a drinking glass or container, the adjacent walls of said containers being spaced from each other, the refrigerating medium in the space between the walls of the inner and intermediate container, and an insulating medium between the walls of the intermediate and outer container.

It is still further an object of the invention to provide three containers in nested relation, there being a gas filled chamber between the walls of the intermediate and outer containers and there being a refrigerating means between the walls of the inner and intermediate container.

These and other objects and advantages of the invention will be fully set forth in the following description made in connection with the accompanying drawings in which like reference characters refer to similar parts throughout the several views and in which:

Fig. 1 is a central vertical section of the device; and

Fig. 2 is a horizontal section taken on line 2—2 of Fig. 1, as indicated by the arrows.

Referring to the drawings, a device is shown comprising an outer container 10. While this container might take various shapes, in the embodiment of the invention illustrated it is shown in the shape of a tumbler or plain drinking glass. A second container 11 is disposed in container 10 and having side and bottom walls which are spaced some distance from the walls of container 10. The walls of containers 10 and 11 are in tight engagement at their upper portions, as shown at 10a. While such engagement may be provided in many ways, in the embodiment of the invention illustrated the upper portion of container 11 fits in the upper portion of container 10, and a circumferential bead 11a is formed on the exterior of container 11, which bead rests on the top of container 10. As shown in Fig. 1 there is a tight engagement between bead 11a and the top of container 10. A chamber 10b is thus formed between the walls of containers 10 and 11. A third container 12 is disposed in container 11 so as shown in the drawing said containers 10, 11 and 12 are in nested relation. The side and bottom walls of container 12 are spaced some distance from the side and bottom walls respectively of container 11. Container 12 constitutes a drinking container or glass, and while the same may take different shapes depending on the type of drink served, in the embodiment of the invention illustrated it is shown as of simple shape in the form of a common tumbler or plain drinking glass. If the device were designed for serving cocktails, the container 12 could be fashioned after the ordinary cocktail glass. As shown in Fig. 1 the side walls of containers 11 and 12 are in tight engagement at their upper portions, and while this could be accomplished in various ways, in the embodiment of the invention illustrated the wall of container 12 fits in the top portion of container 11. Container 12 also has a bead 12a extending about its exterior, which bead rests on the top of container 11. As shown in Fig. 1 of the drawing there is tight engagement between bead 12a and the top of vessel 11. There is thus a chamber 12b between the walls of containers 11 and 12. The chamber 10b will ordinarily be filled with air but the same could be filled with other gases if so desired. A refrigerating means is provided between glasses 11 and 12, and while this could take various forms, in the embodiment of the invention illustrated a freezable liquid 14, such as water, is preferably placed in chamber 12b.

In the use of the device, the liquid 14 is placed in chamber 12b and the device is then placed in a deep freeze refrigerator or other place of suitable low temperature for a considerable length of time. The device is removed from the low temperature location just before using and the drink to be served is placed in the inner container 12. This drink could be cocktail, such as a Martini, Manhattan, or other cocktail, or it could be a mint julep, or any other alcoholic or soft drink. If desired, ice may be placed in the drink. Probably most people enjoy the sound of the ice in the glass in which the drink is served. Most people, however, do not enjoy a drink which has become diluted or which has become warm in a short time. With the present device the liquid 14 will be frozen and the ice placed in the drink will not melt for a long period. The air or other gas in chamber 10b forms an insulating medium and the frozen liquid in chamber 12b will thus not be melted for quite a long period. The drink is thus kept cool both by the refrigerating medium 14 and by the insulating medium in chamber 10b. Sufficient empty space will be left in the top of chamber 12b to permit expansion of the liquid 14 when the same freezes. As repeatedly mentioned, the claimed article is a device. This means a unit or unitary device. The three containers used would necessarily have to be connected together in some way to make such a unitary device. As set forth in the original claim, the device constitutes a cocktail glass which is a unitary device.

With some drinks where it is desired to keep them warm, a hot medium, such as hot water, could be used in chamber 12b.

From the above description it will be seen that I have provided a simple yet highly efficient device for serving a cool drink and keeping the drink desirably cool for a long period. Many people sip their drinks and thus hold the glass for quite a long time. The device will have a high degree of utility for the purpose intended.

It will of course be understood that various changes may be made in the form, details, arrangement and proportions of the parts, without departing from the scope of applicant's invention, which, generally stated, consists in a device capable of carrying out the objects above set forth, in the parts and combinations of parts disclosed and defined in the appended claim.

What is claimed is:

A device for serving beverages having in combination, a vessel having a permanently open upper end so that said upper end is open during normal operation of said device, a second vessel in which said vessel is disposed, the upper portions of said vessel having a tight engagement of mating surfaces at their upper end portions, said first mentioned vessel having a bead extending about its periphery, said bead being engaged by the top of said second vessel, the walls thereof being spaced to form a chamber between said walls extending about said first mentioned vessel to adjacent the top thereof, a refrigerant disposed in said chamber and extending along the sides of said first mentioned vessel well over a major portion of said side, a third vessel in which said second vessel is disposed, said second and third vessels having a tight engagement of mating surfaces at their upper ends, a bead extending about the periphery of said second vessel and engaged by the top of said third vessel, the walls of said second and third vessels being spaced to form a second chamber extending about said second vessel to a point adjacent the top of the latter, said second chamber containing a substance forming a heat insulator extending over a major portion of the length of said third vessel, said vessels forming a unitary device adapted to be held in the hand of the drinker while consuming said beverage so that said beverage is cooled and is not heated by the hand of the drinker and the drinker does not hold a vessel containing a cold substance.

References Cited in the file of this patent

UNITED STATES PATENTS

| | | |
|---|---|---|
| 239,615 | McGregor | Apr. 5, 1881 |
| 1,721,311 | Muenchen | July 16, 1929 |
| 2,162,271 | Munters | June 13, 1939 |
| 2,667,422 | Kauffman | Jan. 26, 1954 |